Patented May 23, 1944

2,349,459

UNITED STATES PATENT OFFICE 2,349,459

MANUFACTURE OF PHENYL o-PHENOXY-BENZOATE

John H. Pearson, Flushing, and Berndt W. Hammarén, Floral Park, N. Y., assignors to General Chemical Company, New York, N. Y., a corporation of New York No Drawing. Application July 30, 1940, Serial No. 348,448

8 Claims. (Cl. 260—476)

This invention relates to the manufacture of phenyl o-phenoxybenzoate, that is, the phenyl ester of o-phenoxybenzoic acid from diphenyl carbonate.

Diphenyl carbonate may be converted to phenyl o-phenoxybenzoate by catalytic rearrangement, for example by heating the diphenyl carbonate in the presence of an alkaline catalyst such as potassium carbonate, as described in patent application Serial No. 313,922, filed January 15, 1940, in the name of Paul W. Bachman and Berndt W. Hammarén. Such processes, applied to large-scale operations, have resulted in disappointingly low yields of phenyl o-phenoxybenzoate.

We have now discovered that diphenyl carbonate prepared on a commercial scale by reaction of phosgene with aqueous sodium phenate contains small proportions of iron impurities, normally between 0.07% and 0.7% of iron, and that by removing the iron impurities from the diphenyl carbonate prior to effecting rearrangement of the diphenyl carbonate to phenyl o-phenoxybenzoate, the yield of phenyl o-phenoxybenzoate obtainable may be increased as much as 25% or more.

The iron impurities may be removed from crude diphenyl carbonate by several methods. The crude diphenyl carbonate may be subjected to vacuum distillation, in which event the iron impurities are retained as distillation residue; the crude diphenyl carbonate may be dissolved in an organic solvent and the solution may be filtered to separate undissolved matter, including iron impurities; the crude diphenyl carbonate may be washed with an aqueous acidic solution to dissolve out the iron impurities; or the crude diphenyl carbonate, after treatment with a suitable alkaline reagent such as sodium carbonate, if necessary, to render the diphenyl carbonate neutral or slightly alkaline, may be filtered or decanted gravitationally or centrifugally at a temperature above its melting point, i. e. at 80° C. or above.

A preferred procedure for removing iron impurities from crude diphenyl carbonate involves washing the crude diphenyl carbonate with about an equal quantity or more of dilute hydrochloric acid at a temperature between about 10° C. and about 100° C. Very effective removal of iron impurities also has been accomplished by dissolving the crude diphenyl carbonate in acetone or benzene, separating the solution from insoluble matter, and recovering the diphenyl carbonate from the solution by distilling off the solvent.

The yield of phenyl o-phenoxybenzoate appears to increase as the proportion of iron in the crude diphenyl-carbonate decreases. However, proportions of iron below about 0.04% have relatively little effect upon the phenyl o-phenoxybenzoate yield and consequently the purification may be conducted merely to reduce the iron content to about this figure.

The following comparison of results obtained in the production of phenyl o-phenoxybenzoate from diphenyl carbonate illustrates the benefits obtainable by virtue of the present invention. In Runs 2a and 3 to 6 inclusive, a diphenyl carbonate obtained by reaction of phosgene and sodium phenolate and containing about ½% of iron (dry basis) present as iron oxide was used. In Runs 2b, 7, and 8 a similar product containing a still larger proportion of iron impurities was used. The conversion of the diphenyl carbonate to phenyl o-phenoxybenzoate was effected by a standard procedure involving heating the diphenyl carbonate with 1% by weight of potassium carbonate for about 3⅓ hours at "boiling" temperature, this temperature rising from an initial temperature of about 230° C. to a final temperature of about 270° C.

*Run #1.*—A diphenyl carbonate manufactured to avoid contamination with iron was converted to phenyl o-phenoxybenzoate by the standard conversion procedure. The yield from this run, representing the maximum expectable yield based upon complete absence of iron, is designated as 100%. Yields obtained in the following runs are expressed as relative yields in comparison with the yield obtained in this run.

*Runs #2a and #2b.*—The two unpurified diphenyl carbonates were separately converted to phenyl o-phenoxybenzoate by the standard conversion procedure. In both cases the relative yields were about 80%.

*Run #3.*—The unpurified diphenyl carbonate was mixed with about 105% of its weight of 10% HCl solution and vigorously agitated for 5 minutes at 85° C., at which temperature the diphenyl carbonate was in liquid phase. The mixture was then allowed to stratify and the HCl solution was separated. The diphenyl carbonate was washed twice with water. In each case it was mixed with its weight of water, vigorously agitated at 85° C. for 5 minutes, and then separated from the aqueous liquor. The diphenyl carbonate product was dried at 180° C. and was then converted to phenyl o-phenoxybenzoate by the standard conversion procedure. The relative yield was about 100%.

*Run #4.*—A wet crude diphenyl carbonate containing about 60% of unpurified diphenyl carbonate in crystal form and the balance water, was washed at 30° C. with an equal weight of 20% HCl solution. The washed diphenyl carbonate crystals were rinsed by running about four times their weight of cold water through the mass of crystals. The washed carbonate was fused, the aqueous layer was decanted, and the thus isolated diphenyl carbonate was dried at 180° C. and then converted to phenyl o-phenoxybenzoate by the standard procedure. The relative yield was approximately 100%.

*Run #5.*—A wet crude product containing about 40% water and the balance unpurified diphenyl carbonate in crystal form was washed with an equal weight of 20% $H_2SO_4$ solution at 30° C. After separation of the acid wash liquor the crystalline diphenyl carbonate was rinsed by running successively about three times its weight of 2% $H_2SO_4$ solution and about three times its weight of cold water through the mass of crystals. The washed product was freed from adhering water as described in Run 4 and then converted to phenyl o-phenoxybenzoate. The relative yield was approximately 100%.

*Run #6.*—A wet crude product containing about 33% water and the balance unpurified diphenyl carbonate was dissolved in about four-fifths of its weight of acetone at 60° C. The solution was filtered. Residue was washed with sufficient acetone to bring the total weight of acetone used to about the weight of the crude product. The filtrate and wash liquor were united and acetone was distilled off. The resulting product was converted to phenyl o-phenoxybenzoate by the standard conversion procedure. The relative yield was about 100%.

*Run #7.*—The unpurified diphenyl carbonate was subjected to vacuum distillation at an absolute pressure of about 25 mm. of mercury. The distillate was converted to phenyl o-phenoxybenzoate by the standard conversion procedure. The relative yield was about 95%.

*Run #8.*—The unpurified diphenyl carbonate was pulverized, mixed with about 105% of its weight of 10% HCl solution. The mixture was heated until the diphenyl carbonate fused (about 80° C.) and vigorously agitated for about 5 minutes. The mixture was then allowed to rest and cool until the diphenyl carbonate had formed a lower layer and had solidified. The upper aqueous layer was poured off. About an equal weight of water was added to the diphenyl carbonate. The mass was heated to about 80° C. to fuse the diphenyl carbonate and vigorously agitated at this temperature as before. The mass was then allowed to rest and cool to cause stratification and solidification of diphenyl carbonate and the wash water was decanted. The diphenyl carbonate was heated to 180° C. to expel retained water and then was converted to phenyl o-phenoxybenzoate by the standard conversion procedure. The relative yield was about 100%.

*Run #9.*—A crude diphenyl carbonate containing about ½% of iron was rendered slightly alkaline to litmus by addition of sodium carbonate. The slightly alkaline diphenyl carbonate was heated to about 85° C. and allowed to rest in a quiescent condition for several hours. A major portion of the diphenyl carbonate was then carefully removed from the top of the mass so as not to disturb the lower portion of the mass containing substantially all of the iron impurities. The diphenyl carbonate thus removed was dried and converted to phenyl o-phenoxybenzoate by the standard conversion procedure. The relative yield was approximately 100%.

We claim:

1. In the manufacture of phenyl o-phenoxybenzoate from crude diphenyl carbonate containing iron impurities by catalytic rearrangement of the diphenyl carbonate, the improvement which comprises separating iron impurities from said diphenyl carbonate prior to effecting said rearrangement.

2. In the manufacture of phenyl o-phenoxybenzoate from crude diphenyl carbonate by catalytic rearrangement of the diphenyl carbonate, the improvement which comprises washing the crude diphenyl carbonate with a strong inorganic acid prior to effecting said rearrangement.

3. In the manufacture of phenyl o-phenoxybenzoate from crude diphenyl carbonate containing iron impurities by catalytic rearrangement of the diphenyl carbonate, the improvement which comprises dissolving the crude diphenyl carbonate in an organic solvent in which iron oxide is insoluble, separating the resulting solution from undissolved iron impurities, and recovering the diphenyl carbonate from solution prior to effecting said rearrangement.

4. In the manufacture of phenyl o-phenoxybenzoate from crude diphenyl carbonate by catalytic rearrangement of the diphenyl carbonate, the improvement which comprises washing the crude diphenyl carbonate with aqueous hydrochloric acid solution prior to effecting said rearrangement.

5. In the manufacture of phenyl o-phenoxybenzoate from crude diphenyl carbonate containing iron impurities by catalytic rearrangement of the diphenyl carbonate, the improvement which comprises dissolving the crude diphenyl carbonate in acetone, separating the resulting solution from undissolved iron impurities, recovering the diphenyl carbonate from solution, and subjecting the recovered diphenyl carbonate to said catalytic rearrangement at an elevated temperature.

6. In the manufacture of phenyl o-phenoxybenzoate from crude diphenyl carbonate containing iron impurities by catalytic rearrangement of the diphenyl carbonate at an elevated temperature, the improvement which comprises washing the crude diphenyl carbonate with dilute aqueous hydrochloric acid solution at a temperature between about 10° C. and about 100° C., and subjecting the washed diphenyl carbonate to said catalytic rearrangement.

7. In the manufacture of phenyl o-phenoxybenzoate from crude diphenyl carbonate containing iron impurities by catalytic rearrangement of the diphenyl carbonate at an elevated temperature, the improvement which comprises rendering the crude diphenyl carbonate non-acidic, heating the non-acidic diphenyl carbonate to a temperature of at least 80° C., separating liquid diphenyl carbonate from the solid residue, and subjecting the diphenyl carbonate thus separated to said catalytic rearrangement.

8. In the manufacture of phenyl o-phenoxybenzoate from crude diphenyl carbonate containing iron impurities by catalytic rearrangement of the diphenyl carbonate at an elevated temperature, the improvement which comprises rendering the crude diphenyl carbonate non-acidic and subjecting the non-acidic crude diphenyl carbonate in liquid phase at a temperature of at least 80° C. to decantation to separate a liquid phase from heavier solids, and subjecting the diphenyl carbonate thus separated to said catalytic rearrangement.

JOHN H. PEARSON.
BERNDT W. HAMMARÉN.